(12) United States Patent
Yang et al.

(10) Patent No.: US 10,818,974 B2
(45) Date of Patent: Oct. 27, 2020

(54) ELECTRODE ASSEMBLY MANUFACTURING METHOD INCLUDING SEPARATOR CUTTING PROCESS

(71) Applicant: LG CHEM, LTD., Seoul (KR)

(72) Inventors: Young Joo Yang, Daejeon (KR); Kyoung Jin An, Daejeon (KR); Dong Hee Sul, Daejeon (KR)

(73) Assignee: LG CHEM, LTD., Seoul (KR)

( * ) Notice: Subject to any disclaimer, the term of this patent is extended or adjusted under 35 U.S.C. 154(b) by 158 days.

(21) Appl. No.: 16/046,097

(22) Filed: Jul. 26, 2018

(65) Prior Publication Data

US 2018/0331388 A1  Nov. 15, 2018

Related U.S. Application Data

(60) Division of application No. 14/516,348, filed on Oct. 16, 2014, now Pat. No. 10,069,169, which is a
(Continued)

(30) Foreign Application Priority Data

Jun. 28, 2013 (KR) .................. 10-2013-0075189
Jun. 27, 2014 (KR) .................. 10-2014-0079517

(51) Int. Cl.
*H01M 10/058* (2010.01)
*H01M 10/04* (2006.01)
(Continued)

(52) U.S. Cl.
CPC ......... *H01M 10/058* (2013.01); *H01M 2/168* (2013.01); *H01M 4/0402* (2013.01);
(Continued)

(58) Field of Classification Search
CPC ............ H01M 10/04; H01M 10/0404; H01M 10/0463; H01M 10/052; H01M 10/058;
(Continued)

(56) References Cited

U.S. PATENT DOCUMENTS 6,531,662 B1  3/2003 Nakamura
7,138,210 B2  11/2006 Kim et al.
(Continued)

FOREIGN PATENT DOCUMENTS

EP  2333876 A2  6/2011
EP  2747184 A1  6/2014
(Continued)

OTHER PUBLICATIONS

Extended European Search Report dated Jun. 17, 2015, for European Application No. 14818832.9.
(Continued)

*Primary Examiner* — Victoria H Lynch
(74) *Attorney, Agent, or Firm* — Birch, Stewart, Kolasch & Birch, LLP

(57) ABSTRACT

Provided is an electrode assembly manufacturing method including a process of cutting a separator included in an electrode assembly to have a margin protruding from an electrode plate. The method includes a first process of manufacturing one type of basic unit sheets having a structure in which electrode materials and separator materials, which are the same in number, are alternately stacked, or two or more types of basic unit sheets having a structure in which electrode materials and separator materials, which are the same in number, are alternately stacked, and a second-A process of cutting a portion of a margin area of the separator materials, which are not covered with the electrode materi-
(Continued)

als, such that the separator materials of the basic unit sheets protrude over a specific distance from edges of the electrode materials.

7 Claims, 30 Drawing Sheets

Related U.S. Application Data continuation of application No. PCT/KR2014/005735, filed on Jun. 27, 2014.

(51) Int. Cl.
    *H01M 2/16*     (2006.01)
    *H01M 4/04*     (2006.01)
    *H01M 10/0585*     (2010.01)
    *H01M 10/052*     (2010.01)

(52) U.S. Cl.
    CPC ....... *H01M 10/04* (2013.01); *H01M 10/0463* (2013.01); *H01M 2/166* (2013.01); *H01M 2/1686* (2013.01); *H01M 10/0404* (2013.01); *H01M 10/052* (2013.01); *H01M 10/0585* (2013.01); *Y10T 29/49108* (2015.01); *Y10T 29/49114* (2015.01); *Y10T 29/49115* (2015.01)

(58) Field of Classification Search
    CPC .. H01M 10/0585; H01M 2/166; H01M 2/168; H01M 2/1686; H01M 4/0402
    See application file for complete search history.

(56) References Cited

U.S. PATENT DOCUMENTS

| | | |
|---|---|---|
| 2002/0124949 A1 | 9/2002 | Fukuda et al. |
| 2002/0160257 A1 | 10/2002 | Lee et al. |
| 2002/0160258 A1 | 10/2002 | Lee et al. |
| 2003/0077509 A1 | 4/2003 | Probst et al. |
| 2003/0140482 A1 | 7/2003 | Murata et al. |
| 2009/0246626 A1 | 10/2009 | Tasaki et al. |
| 2009/0317713 A1 | 12/2009 | Kim et al. |
| 2010/0151359 A1 | 6/2010 | Tanaka et al. |
| 2011/0135996 A1 | 6/2011 | Ahn et al. |
| 2012/0034509 A1 | 2/2012 | Bae et al. |
| 2012/0225345 A1 | 9/2012 | Kim |
| 2013/0108906 A1 | 5/2013 | Bhardwaj et al. |
| 2013/0122350 A1 | 5/2013 | Hagiwara et al. |
| 2013/0244083 A1 | 9/2013 | Min et al. |
| 2014/0106193 A1 | 4/2014 | Kim et al. |
| 2014/0134472 A1 | 5/2014 | Kim |
| 2014/0349192 A1 | 11/2014 | Park et al. |
| 2014/0373343 A1 | 12/2014 | Park et al. |

FOREIGN PATENT DOCUMENTS

| | | |
|---|---|---|
| EP | 2808933 A2 | 12/2014 |
| JP | S63-224149 A | 9/1988 |
| JP | 2001-28275 A | 1/2001 |
| JP | 2001-84985 A | 3/2001 |
| JP | 2002-373649 A | 12/2002 |
| JP | 2003-217601 A | 7/2003 |
| JP | 2005-129366 A | 5/2005 |
| JP | 2012-160352 A | 8/2012 |
| JP | 2013-101829 A | 5/2013 |
| JP | 2013-524460 A | 6/2013 |
| KR | 2001-0082059 A | 8/2001 |
| KR | 2001-0082060 A | 8/2001 |
| KR | 10-2008-0052869 A | 6/2008 |
| KR | 10-2009-0132500 A | 12/2009 |
| KR | 10-1084909 B1 | 11/2011 |
| KR | 10-2012-0060704 A | 6/2012 |
| KR | 10-2012-0117306 A | 10/2012 |
| KR | 10-2013-0131247 A | 12/2013 |
| WO | WO 2013/042948 A2 | 3/2013 |
| WO | WO 2014/189319 A1 | 11/2014 |

OTHER PUBLICATIONS

European Office Action dated Jan. 20, 2017 in EP Application No. 14 818 832.9.
Machine translation JPS63224149A (Year: 1988).

ELECTRODE ASSEMBLY MANUFACTURING METHOD INCLUDING SEPARATOR CUTTING PROCESS

CROSS-REFERENCE TO RELATED APPLICATIONS

This application is a Divisional of U.S. application Ser. No. 14/516,348, filed on Oct. 16, 2014, which is a Continuation of PCT International Application No. PCT/KR2014/005735, filed on Jun. 27, 2014, which claims priority under 35 U.S.C. 119(a) to Patent Application No. 10-2013-0075189 and Patent Application No. 10-2014-0079517, filed in the Republic of Korea on Jun. 28, 2013 and Jun. 27, 2014 respectively, all of which are hereby expressly incorporated by reference into the present application.

FIELD OF THE INVENTION

The present invention relates to an electrode assembly manufacturing method including a separator cutting process, and more particularly, to an electrode assembly manufacturing method including a process of cutting a separator included in an electrode assembly to have a margin protruding from an electrode plate.

DISCUSSION OF RELATED ART

As mobile devices are technically developed and are in increasing demand, demands for secondary batteries quickly increase. Of these secondary batteries, lithium (ion/polymer) secondary batteries which have high energy density, high operation voltage, and excellent preservation and service life characteristics are widely used as energy sources of various electronic products as well as mobile devices.

Korean Patent Publication No. 2008-0052869 discloses a structure of a general secondary battery, and more particularly, a structure of a pouch type secondary battery having a bilateral symmetric and approximately rectangular shape.

Such secondary batteries having a rectangular shape improve space utilization of devices on which the secondary batteries are installed. However, the secondary batteries having a rectangular shape may confine the space utilization of the devices. Thus, an edge of a rectangular electrode assembly included in the secondary batteries may be cut, or a through hole part may be formed in the central part of the rectangular electrode assembly, or a corner of the rectangular electrode assembly may be rounded or chamfered such that the secondary batteries have optimal shapes according to the devices and are thus appropriately installed thereon.

Electrode assemblies may be classified into jell-roll-type electrode assemblies, stack/folding-type electrode assemblies, and stack-type electrode assemblies according to methods of manufacturing the electrode assemblies. The jell-roll-type electrode assemblies are inappropriate for the chamfering and the forming of a through hole part.

Korean Patent Publication Nos. 2001-0082059 and 2001-0082060, applied by the applicant of the present invention, disclose stack/folding-type electrode assemblies. The stack/folding-type electrode assemblies are formed by disposing a full cell having a cathode/separator/anode structure on a separator sheet and folding the full cell. Thus, the separator sheet has a significantly great thickness at an edge of the full cell and is thus significantly difficult to cut at a time.

Finally, stack-type electrode assemblies are formed by sequentially and continuously stacking a cathode, a separator, an anode, and a separator. However, in this case, it is difficult to accurately align layers of a stacked structure. In addition, when a separator that is misaligned with an electrode is cut, the electrode may be damaged. To address these issues, separators may be separately prepared, and a corner or edge thereof may be cut, or a through hole part may be formed in the central part thereof. However, it is significantly inefficient to alternately stack the separators and electrodes after a cutting process, which significantly decreases productivity. In addition, since the separators are soft and are easily deformed by heat, while the separators are stacked on the electrodes after the cutting process, the separators may become greater or smaller than a desired size. Thus, it is difficult to manufacture an electrode assembly accurately having a desired size, and the yield rate of acceptable electrode assemblies is significantly decreased.

SUMMARY OF THE INVENTION

Technical Problem

Accordingly, the present invention aims at providing an electrode assembly manufacturing method including a process of most efficiently cutting a separator to manufacture an electrode assembly having a shape different from a typical rectangular shape.

The present invention also aims at providing an electrode assembly manufacturing method which prevents a separator from being damaged while the separator is cut.

The present invention also aims at increasing the productivity and yield rate of electrode assemblies having a shape different from a typical rectangular shape.

Technical Solution

According to an aspect of the present invention, there is provided an electrode assembly manufacturing method including: a first process of manufacturing one type of basic unit sheets having a structure in which electrode materials and separator materials, which are the same in number, are alternately stacked, or two or more types of basic unit sheets having a structure in which electrode materials and separator materials, which are the same in number, are alternately stacked; and a second-A process of cutting a portion of a margin area of the separator materials, which are not covered with the electrode materials, such that the separator materials of the basic unit sheets protrude over a specific distance from edges of the electrode materials, wherein the one type of the basic unit sheets have a four-layer structure formed by sequentially stacking a first electrode material, a first separator material, a second electrode material, and a second separator material, or a structure formed by repeatedly stacking the four-layer structure, and the two or more types of the basic unit sheets are stacked one by one in a predetermined order to form the four-layer structure or a structure formed by repeatedly stacking the four-layer structure.

According to another aspect of the present invention, there is provided an electrode assembly manufacturing method including: a first process of manufacturing one type of basic unit sheets having a structure in which electrode materials and separator materials, which are the same in number, are alternately stacked, or two or more types of basic unit sheets having a structure in which electrode materials and separator materials, which are the same in number, are alternately stacked; a second-B process of forming an electrode assembly by repeatedly stacking unit structures formed by cutting the one type of the basic unit sheets at regular intervals, or by stacking, in a predetermined order, two or more types of unit structures formed by cutting each of the two or more types of the basic unit sheets at the regular intervals; and a third process of cutting a portion of a margin area of the separator materials, which are not covered with the electrode materials, such that the separator materials included in the electrode assembly protrude over a specific distance from edges of the electrode materials, wherein the one type of the basic unit sheets have a four-layer structure formed by sequentially stacking a first electrode material, a first separator material, a second electrode material, and a second separator material, or a structure formed by repeatedly stacking the four-layer structure, and the two or more types of the basic unit sheets are stacked one by one in a predetermined order to form the four-layer structure or a structure formed by repeatedly stacking the four-layer structure.

Advantageous Effects

According to the present invention, provided is an electrode assembly manufacturing method including a process of most efficiently cutting a separator to manufacture an electrode assembly having a shape different from a typical rectangular shape.

In addition, the separator is prevented from being damaged while the separator is cut.

In addition, the productivity and yield rate of electrode assemblies having a shape different from a typical rectangular shape are increased.

DETAILED DESCRIPTION

Figure 1:
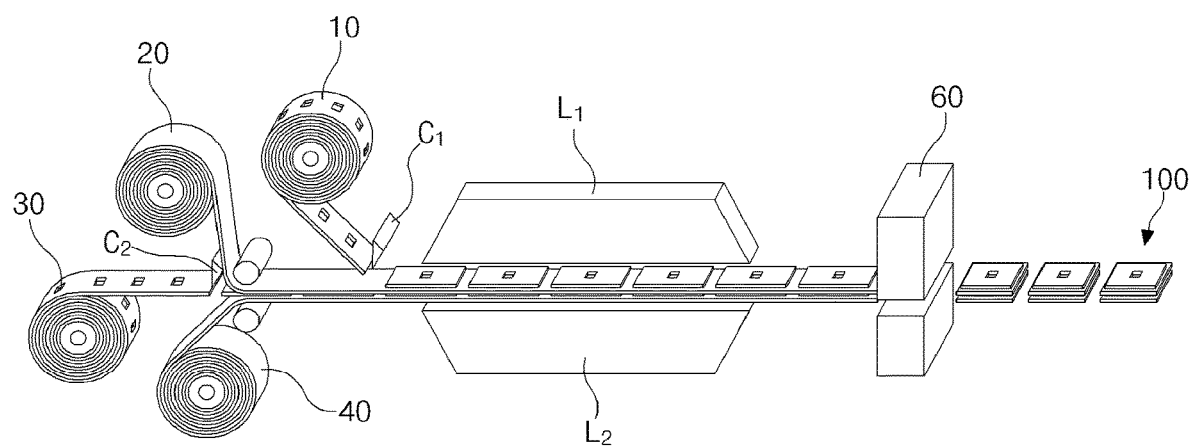
FIG. 1 is a schematic view illustrating an apparatus that embodies an electrode assembly manufacturing method according to a first embodiment of the present invention.

Hereinafter, constitutions and operations according to the present invention will be described in detail with reference to the accompanying drawings. Like reference numerals denote like elements, and a repeated description will be omitted. It will be understood that although the terms of first and second are used herein to describe various elements, these elements should not be limited by these terms. The terms are only used to distinguish one component from other components.

Embodiment 1

An electrode assembly manufacturing method according to a first embodiment of the present invention includes: a first process in which a first electrode material 10, a separator material 20, a second electrode material 30, and a separator material 40 sequentially undergo a laminating process to form a four-layer sheet; and a second-A process in which a portion of a margin area M of the separator materials 20 and 40, which are not covered with the first and second electrode materials 10 and 30, is cut using a mold cutter 60 such that the separator materials 20 and 40 of the four-layer sheet formed through the first process protrude over a specific distance D from edges 12 and 32 of the first and second electrode materials 10 and 30.

[First Process]

The first process will now be described with reference to FIG. 1.

First, the first electrode material 10, the separator material 20, the second electrode material 30, and the separator material 40 are prepared. The separator materials 20 and 40 are greater than the first and second electrode materials 10 and 30 in the horizontal and vertical directions thereof (refer to FIG. 2). The first electrode material 10, the separator material 20, the second electrode material 30, and the separator material 40 may be wound around rolls and be then unwound to be supplied to laminators L1 and L2 for process automation. The first electrode material 10 is cut to a predetermined size using a cutter C1, and the second electrode material 30 is cut to a predetermined size using a cutter C2.

In more particular, the separator materials 20 and 40 are unwound from rolls and are then directly supplied to the laminators L1 and L2, and the first electrode material 10 is supplied to the upper part of the separator material 20, and the second electrode material 30 is supplied to the upper part of the separator material 40. However, before the separator materials 20 and 40 are supplied from the roll to the laminators L1 and L2, the separator materials 20 and 40 may be cut by separate cutters, like the first and second electrode materials 10 and 30.

The first electrode material 10, the separator material 20, the second electrode material 30, and the separator material 40 are formed into the four-layer sheet through the laminating process by the laminators L1 and L2. In particular, the laminators L1 and L2 manufacture the four-layer sheet by pressing, or heating and pressing the first electrode material 10, the separator material 20, the second electrode material 30, and the separator material 40.

In this case, surfaces of the separator materials 20 and 40 may be coated with a coating material having adhesive force.

Both surfaces of the separator material 20 disposed between the first and second electrode materials 10 and 30 may be coated with the coating material, and only one surface of the separator material 40 contacting the second electrode material 30 may be coated with the coating material.

<Expansion of Concept of Four-Layer Sheet to Concept of Basic Unit Sheet>

A concept of the four-layer sheet as described above may be expanded to a concept of a basic unit sheet. That is, the concept of the four-layer sheet constituted by the first electrode material 10, the separator material 20, the second electrode material 30, and the separator material 40 may be replaced with the concept of the basic unit sheet in which electrode materials and separator materials, which are the same in number, are alternately stacked. In particular, while the four-layer sheet is limited to four layers, the basic unit sheet may be applied to multi-layer sheets including the four-layer sheet.

The four-layer sheet or the basic unit sheet is cut at regular intervals to form a unit structure. The basic unit sheet may be used to from a first, second, or third unit structure to be described later.

Thus, the unit structure will now be described first.

<Structure of Unit Structure>

Figure 14:
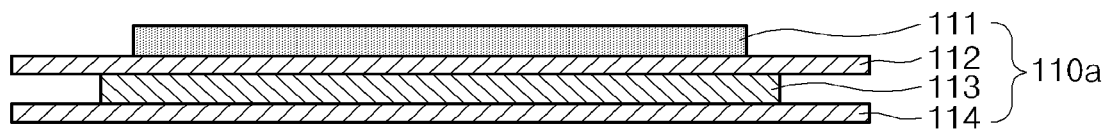
FIG. 14 is a side view illustrating a first structure of a unit structure.
Figure 15:
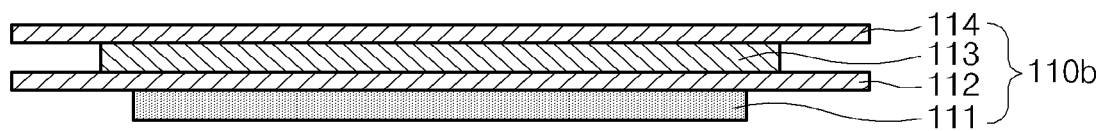
FIG. 15 is a side view illustrating a second structure of a unit structure.

A unit structure is formed by alternately stacking electrodes and separators, which are the same in number. Referring to FIG. 14, a unit structure 110*a* may be formed by stacking two electrodes 111 and 113 and two separators 112 and 114. In this case, a cathode and an anode may face each other with a separator therebetween. When the unit structure is formed as such, an electrode (refer to the electrode 111 illustrated in FIGS. 14 and 15) is disposed at the distal end of a side of the unit structure, and a separator (refer to the separator 114 illustrated in FIGS. 14 and 15) is disposed at the distal end of another side of the unit structure.

An electrode assembly may be formed just by stacking unit structures. In this case, the electrode assembly may be formed by repeatedly stacking one type of unit structures or stacking two or more types of unit structures in a predetermined order. To this end, the unit structures may have the following structure.

First, a unit structure may be formed by sequentially stacking a first electrode, a first separator, a second electrode, and a second separator. In more particular, referring to FIG. 14, the unit structure 110*a* may be formed by sequentially stacking the first electrode 111, the first separator 112, the second electrode 113, and the second separator 114 from the upper side of the unit structure 110*a* to the lower side thereof. Alternatively, referring to FIG. 15, a unit structure 110*b* may be formed by sequentially stacking the first electrode 111, the first separator 112, the second electrode 113, and the second separator 114 from the lower side of the unit structure 110*b* to the upper side thereof. Hereinafter, a unit structure having such a structure will be referred to as the first unit structure. The pole of the first electrode 111 is opposite to the pole of the second electrode 113. For example, when the first electrode 111 is a cathode, the second electrode 113 is an anode.

Figure 16:
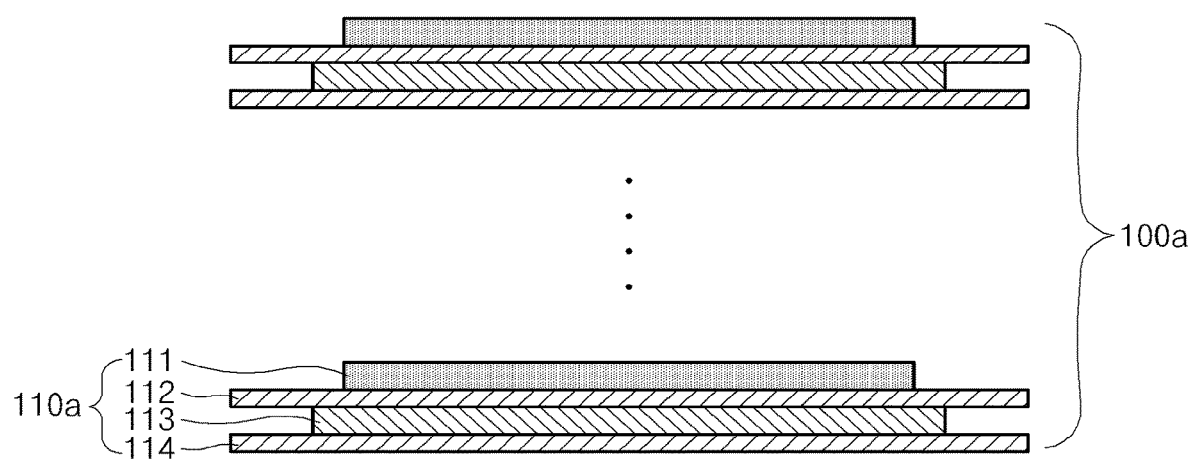
FIG. 16 is a side view illustrating an electrode assembly formed by repeatedly stacking the unit structure of FIG. 14.

As such, since the unit structure is formed by sequentially stacking the first electrode, the first separator, the second electrode, and the second separator, an electrode assembly 100*a* may be formed just by repeatedly stacking one type of unit structures 110*a*, as illustrated in FIG. 16, through an electrode assembly manufacturing process. Furthermore, a unit structure may have not only such a four-layer structure, but also an eight-layer or ten-layer structure. That is, a unit structure may have a structure formed by repeatedly stacking the four-layer structure. For example, a unit structure may be formed by sequentially stacking the first electrode, the first separator, the second electrode, the second separator, the first electrode, the first separator, the second electrode, and the second separator.

Secondly, a unit structure may be formed by sequentially stacking the first electrode, the first separator, the second electrode, the second separator, the first electrode, and the first separator, or the second electrode, the second separator, the first electrode, the first separator, the second electrode, and the second separator, Hereinafter, the unit structure formed by sequentially stacking the first electrode, the first separator, the second electrode, the second separator, the first electrode, and the first separator will be referred to as the second unit structure, and the unit structure formed by sequentially stacking the second electrode, the second separator, the first electrode, the first separator, the second electrode, and the second separator will be referred to as the third unit structure.

Figure 17:
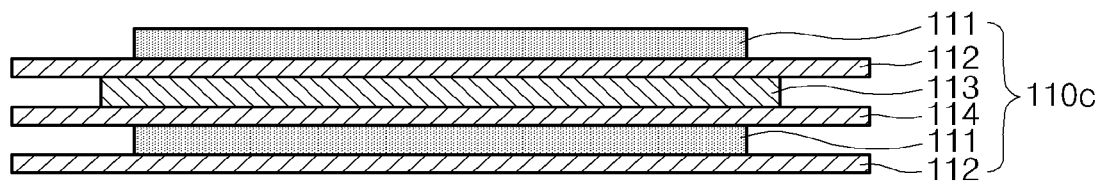
FIG. 17 is a side view illustrating a third structure of a unit structure.
Figure 18:
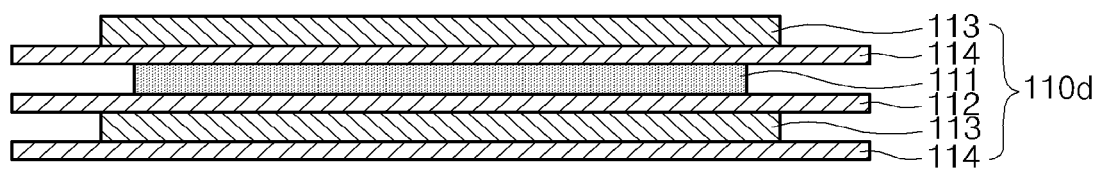
FIG. 18 is a side view illustrating a fourth structure of a unit structure.

In more particular, referring to FIG. 17, a second unit structure 110*c* may be formed by sequentially stacking the first electrode 111, the first separator 112, the second electrode 113, the second separator 114, the first electrode 111, and the first separator 112 from the upper side of the second unit structure 110*c* to the lower side thereof. In addition, referring to FIG. 18, a third unit structure 110*d* may be formed by sequentially stacking the second electrode 113, the second separator 114, the first electrode 111, the first separator 112, the second electrode 113, and the second separator 114 from the upper side of the third unit structure 110d to the lower side thereof. The order from the upper side to the lower side may be reversed.

Figure 19:
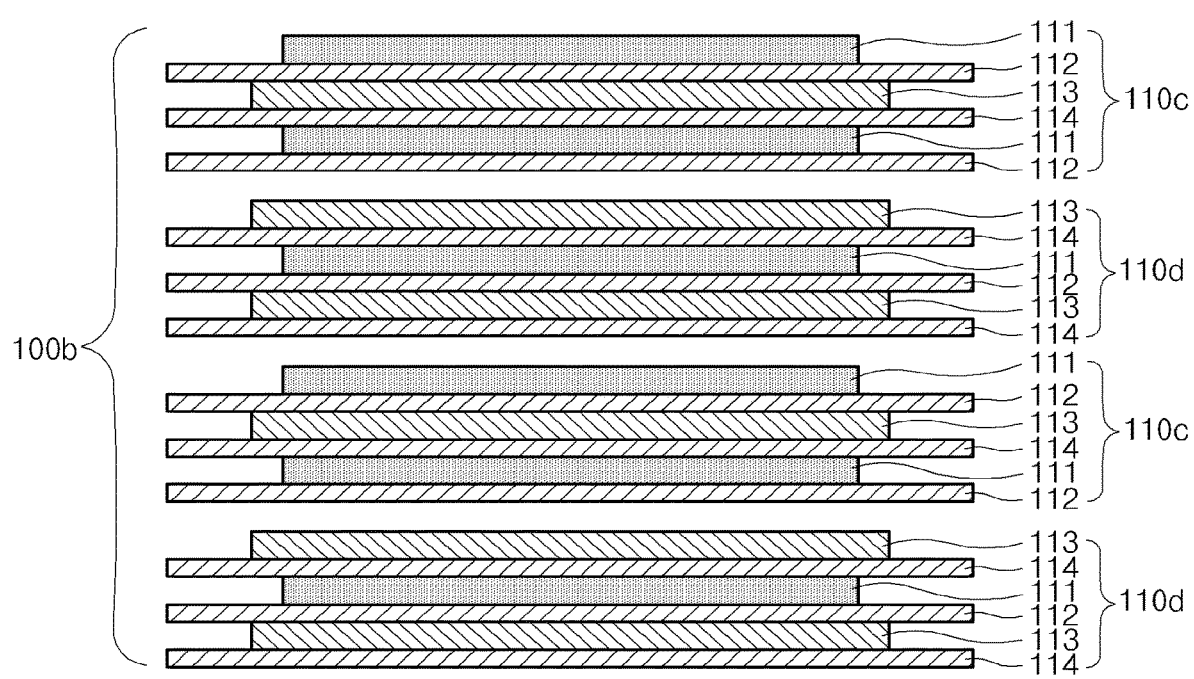
FIG. 19 is a side view illustrating an electrode assembly formed by stacking the unit structure of FIG. 17 and the unit structure of FIG. 18.

When the second unit structure 110c and the third unit structure 110d are stacked, a structure formed by repeatedly stacking a four-layer structure is formed. Thus, referring to FIG. 19, an electrode assembly 100b may be formed just by alternately stacking second unit structures 110c and third unit structures 110d one by one.

As such, one type of unit structures have the four-layer structure formed by sequentially stacking the first electrode, the first separator, the second electrode, and the second separator, or the structure formed by repeatedly stacking the four-layer structure. In addition, two or more types of unit structures are stacked one by one in a predetermined order to form the four-layer structure or the structure formed by repeatedly stacking the four-layer structure. For example, the first unit structure has the four-layer structure, and a stack of the second and third unit structures has a twelve-layer structure formed by repeatedly stacking the four-layer structure.

Thus, an electrode assembly may be formed just by repeatedly stacking one type of unit structures or stacking two or more types of unit structures in a predetermined order.

<Manufacturing of Unit Structure>

A process of manufacturing a unit structure will now be described. As described above, a unit structure may be manufactured by cutting a basic unit sheet at regular intervals.

Stacked electrode materials and separators materials of the basic unit sheet may be adhered to one another by laminators, as described above. Thus, when a basic unit sheet processed through such an adhering process is cut, a unit structure including integrally coupled electrodes and separators is formed.

A laminator presses a raw material to be adhered, or presses and heats a raw material to be adhered. Integrated unit structures, obtained from basic unit sheets manufactured through such an adhering process, are more easily stacked when an electrode assembly is manufactured. In addition, the integrated unit structures, obtained from the basic unit sheets manufactured through the adhering process, are more efficiently aligned.

As described above, in a method of manufacturing a unit structure, an electrode of the unit structure may be adhered to a separator adjacent to the electrode. Alternatively, the separator may be adhered to the electrode. A surface of the electrode facing the separator may be entirely adhered to the separator. Accordingly, the electrode is stably fixed to the separator. The electrode may be smaller than the separator.

An adhesive may be applied to the separator in order to adhere the electrode to the separator. The adhesive may be applied in a mesh or dot pattern to an adhesion surface. This is because if the adhesive is closely applied to the whole of the adhesion surface, reactive ions such as lithium ions cannot pass through the separator. Thus, even though the electrode is entirely adhered to the separator (that is, to the whole of the adhesion surface) by the adhesive, the electrode is not closely adhered thereto.

Alternatively, the electrode may be entirely adhered to a separator including a coating layer having adhesive force. In particular, the separator may include a porous separator base material such as a polyolefin-based separator base material, and a porous coating layer that is formed on the whole of one or both surfaces of the separator base material. The coating layer may be formed of a mixture of inorganic particles and a binder polymer that connects and fixes the inorganic particles to one another.

The inorganic particles may improve thermal stability of the separator. That is, the inorganic particles may prevent the separator from contracting at a high temperature. The binder polymer may improve mechanical stability of the separator by fixing the inorganic particles. In addition, the binder polymer may adhere the electrode to the separator. Since the binder polymer is distributed in the whole of the coating layer, the electrode is closely adhered to the whole of the adhesion surface by the binder polymer, unlike the above described adhesive. Thus, the electrode is more stably fixed to the separator including the coating layer. The above described laminators may be used to improve the adhesion of the electrode to the separator.

The inorganic particles may constitute a densely packed structure to form interstitial volumes between the inorganic particles in the whole of the coating layer. The interstitial volumes defined by the inorganic particles may form a porous structure in the coating layer. Even though the coating layer is formed in the separator, the porous structure allows lithium ions to efficiently pass through the separator. For reference, the interstitial volumes defined by the inorganic particles may be clogged with the binder polymer according to locations of the interstitial volumes.

The densely packed structure may be described as a structure in which pebbles are contained in a glass bottle. Thus, when the inorganic particles constitute the densely packed structure, the interstitial volumes between the inorganic particles are formed in the whole of the coating layer, not in a portion of the coating layer. Thus, as the size of the inorganic particles increases, the size of pores also increases according to the interstitial volumes. The densely packed structure allows the lithium ions to efficiently pass through the separator through the all surfaces thereof.

Unit structures of an electrode assembly may be adhered to each other. For example, referring to FIG. 14, when an adhesive or the above-described coating layer is applied to the lower surface of the second separator 114, another unit structure may be adhered to the lower surface of the second separator 114.

In this case, adhesive force between an electrode and a separator in a unit structure may be greater than adhesive force between unit structures in an electrode assembly. Alternatively, there may be no adhesive force between the unit structures. In this case, the possibility that the electrode assembly is disassembled into the unit structures in an electrode assembly disassembling process is increased because of a difference in adhesive force. For reference, the adhesive force may be expressed as peeling force. For example, adhesive force between an electrode and a separator may be expressed as force needed to detach the electrode and the separator from each other. As such, neighboring unit structures in an electrode assembly may not be coupled to each other, or be coupled to each other by coupling force that is different from coupling force between an electrode and a separator in the unit structures.

For reference, when a separator includes the above-described coating layer, ultrasonic welding may be undesirable for the separator. A separator may be greater than an electrode. Thus, a distal end of the first separator 112 may be coupled to a distal end of the second separator 114 through ultrasonic welding. The ultrasonic welding requires a horn that directly presses an object. However, if the horn directly presses a distal end of a separator, the horn may be adhered to the separator by the coating layer having adhesive force, which may cause a device failure.

<Basic Unit Sheet>

To form a unit structure as described above when a basic unit sheet is cut at regular intervals, the basic unit sheet may have the same stacked form as that of the unit structure. That is, although the basic unit sheet has a long sheet form, the stacked form of the basic unit sheet, constituted by electrode materials and separator materials, may be the same as that of the unit structure.

In this case, the basic unit sheet may be one type of basic unit sheets having a structure in which electrode materials and separator materials, which are the same in number, are alternately stacked, or two or more types of basic unit sheets having a structure in which electrode materials and separator materials, which are the same in number, are alternately stacked.

The one type of the basic unit sheets have a four-layer structure formed by sequentially stacking a first electrode material, a first separator material, a second electrode material, and a second separator material, or a structure formed by repeatedly stacking the four-layer structure. When the two or more types of the basic unit sheets are stacked one by one in a predetermined order, the two or more types of the basic unit sheets have the four-layer structure or a structure formed by repeatedly stacking the four-layer structure.

The first process may manufacture the basic unit sheets.

[Second-A Process and Electrode Assembly Manufacturing Process]

The second-A process will now be described with reference to FIGS. 1 to 6.

First, terms used in the second-A process will now be defined. The margin area M is a portion of the entire area of the separator materials 20 and 40, which is not covered with the first and second electrode materials 10 and 30, and is depicted with a shadow in FIG. 2. Edges of the first and second electrode materials 10 and 30 include the edge 12 as an outer edge and the edges 12 as edges of through hole parts formed in central parts of the first electrode material 10 illustrated in FIG. 2. The definition of the terms is also applied to a description of a second embodiment.

When the second-A process is simply described based on the definition of the terms, the second-A process may be a process of cutting the portion of the margin area M of the separator materials 20 and 40, except for the protrusions thereof over the specific distance D from the edges 12 and 32 of the first and second electrode materials 10 and 30, by using the mold cutter 60.

A process of cutting the margin area M by using the mold cutter 60 in the second-A process will now be described.

Figure 3:
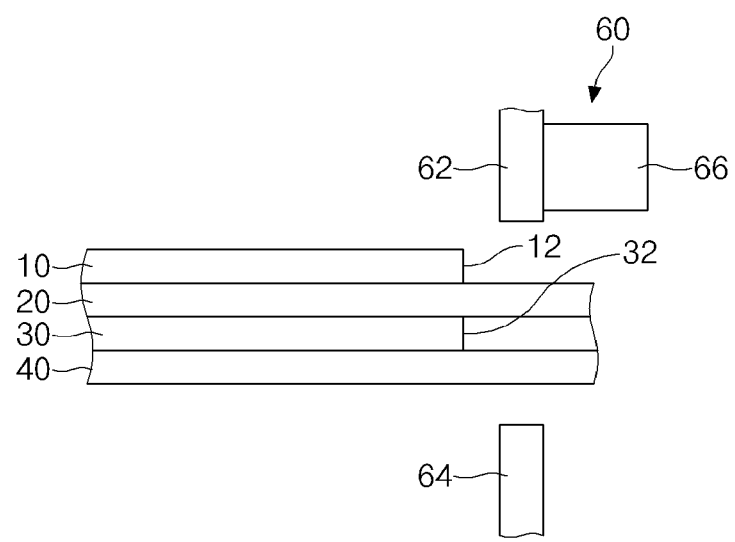
FIGS. 3 to 6 are a series of schematic views illustrating a second-A process of the electrode assembly manufacturing method according to the first embodiment.
Figure 4:
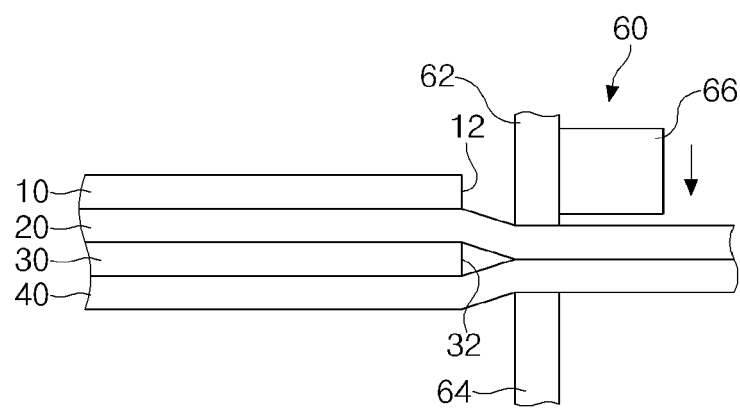

First, referring to FIG. 3, the separator materials 20 and 40 of the four-layer sheet are disposed between an upper mold 62 and a lower mold 64 of the mold cutter 60 which are spaced apart from each other. After that, at least one of the upper mold 62 and the lower mold 64 is moved to hold only the separator materials 20 and 40 therebetween. For example, referring to FIG. 4, the upper mold 62 may be moved to hold the separator materials 20 and 40.

Figure 5:
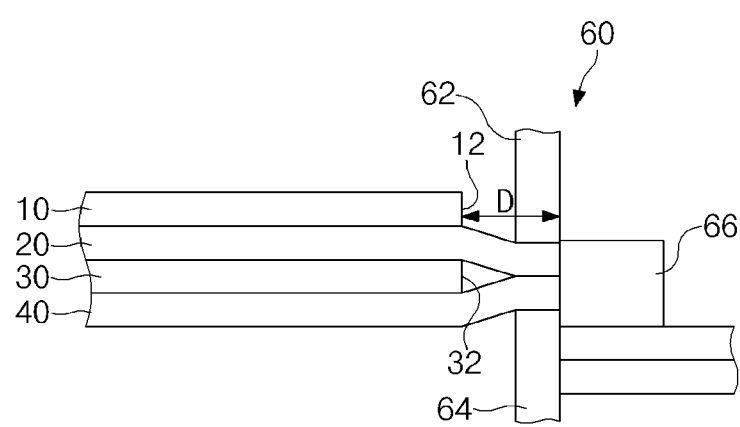
Figure 6:
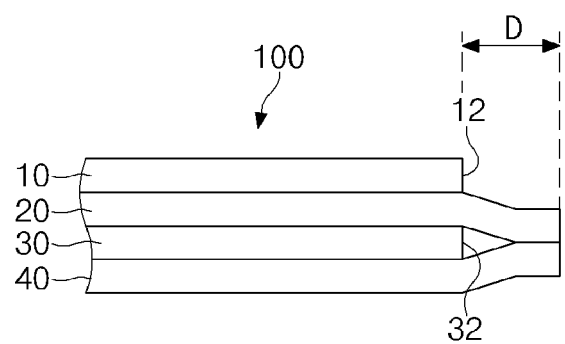

Next, referring to FIG. 5, the portion of the margin area M of the separator materials 20 and 40 fixed and held by the upper mold 62 and the lower mold 64 is cut using a cutting block 66. As a result, referring to FIG. 6, a unit structure in which the separator materials 20 and 40 protrude over the specific distance D from the edges 12 and 32 of the first and second electrode materials 10 and 30 may be formed.

Figure 7:
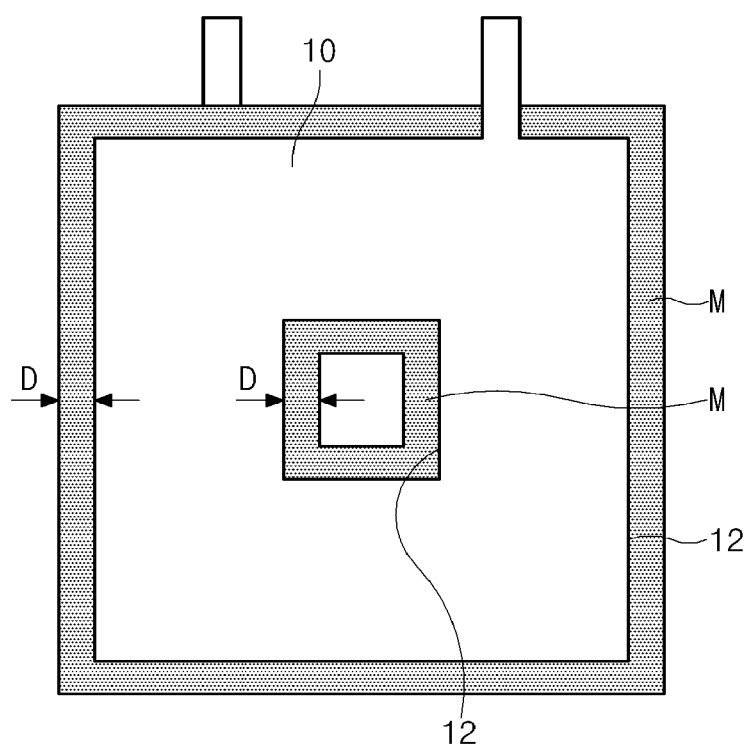
FIG. 7 is a plan view illustrating a unit structure according to the present invention.

FIG. 7 is a view illustrating a unit structure 100 manufactured according to a cutting method of the mold cutter 60 illustrated in FIGS. 3 to 6. The mold cutter 60 may have a structure to cut both the edge 12, as the edge of a through hole part formed in the central part of the unit structure 100 illustrated in FIG. 7, and the edge 12 as the outer edge of the unit structure 100. In this case, the mold cutter 60 may cut not only the margin area M, but also the four-layer sheet at regular intervals to form the unit structure 100. FIG. 1 is a schematic view illustrating an example of an apparatus including the mold cutter 60.

The mold cutter 60 may not simultaneously cut "the margin area M" and "the four-layer sheet at the regular intervals". The mold cutter 60 may sequentially cut the portion of the margin area M and the four-layer sheet at the regular intervals.

Alternatively, the apparatus may be configured such that the mold cutter 60 cuts only the portion of the margin area M, and a separate cutter cuts the four-layer sheet at the regular intervals.

Figure 2:
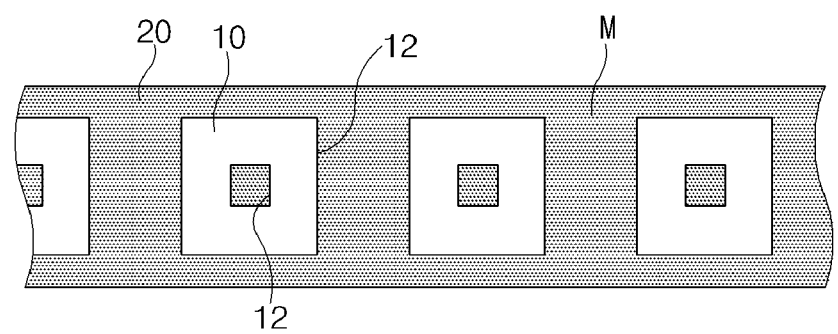
FIG. 2 is a plan view illustrating a four-layer sheet of FIG. 1.
Figure 8:
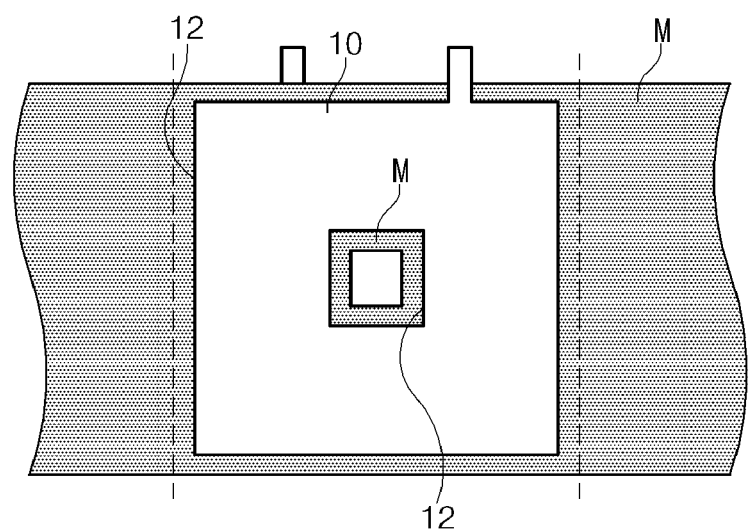
FIG. 8 is a plan view illustrating a state in which a margin area disposed at the edge of the central part of a unit structure is cut using a mold cutter.

In this case, referring to FIGS. 2 and 8, a through hole part is formed inside of an electrode material, and the portion of the margin area M cut using the mold cutter 60 may be a portion of the separator material 20 exposed through the through hole part, except for a portion spaced the specific distance D from the inner edge of the through hole part.

Thus, the portion of the margin area M exposed through the through hole part, except for the portion of the margin area M inwardly protruding over the specific distance D from the edge 12 as the inner edge of the through hole part, may be cut using the mold cutter 60 in the second-A process.

Figure 9:
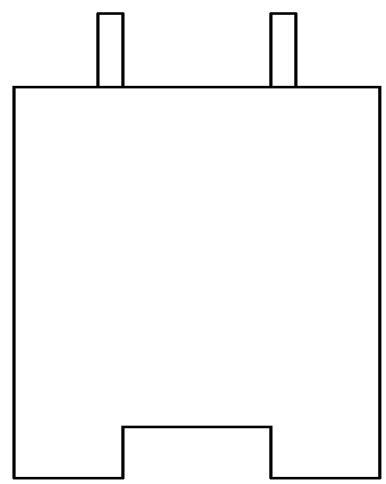
FIGS. 9 to 11 are plan views illustrating battery cells having various shapes.
Figure 10:
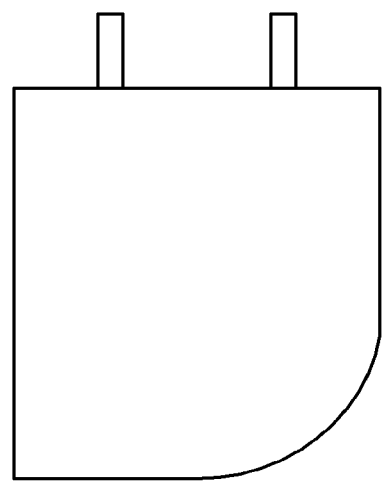
Figure 11:
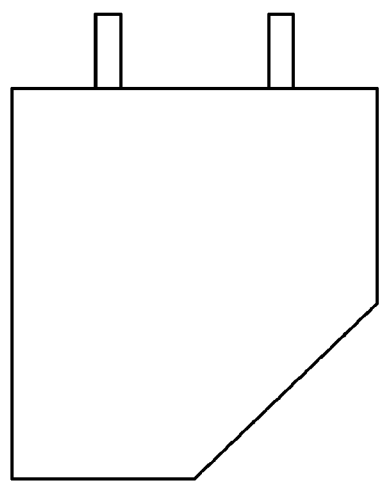

This concept can be applied to a special shape such as an electrode material having a round corner as well as an electrode material having a through hole part therein. Examples of an electrode material having a special shape are illustrated in FIGS. 9 to 11.

For example, when an electrode material has an uneven edge that does not straightly extend from a straight edge at a corner, a portion of a margin area disposed outside of the uneven edge, except for a portion of the margin area outwardly protruding over the specific distance D from the uneven edge, may be cut to correspond to the uneven edge by using a mold cutter in the second-A process.

The uneven edge may be an edge of a tapered shape or a round corner. The cutting corresponding to the uneven edge by using the mold cutter means cutting an unnecessary portion of a separator material along the uneven edge and does not mean cutting an unnecessary portion of the separator material along all edges of the electrode material.

As described above, the portion of the margin area M may be cut using the mold cutter 60, and then, the four-layer sheet may be cut at the regular intervals through a separate process to form the unit structure 100.

In this case, a cutter for cutting the four-layer sheet at the regular intervals is disposed at an output end side of the mold cutter 60 used in the second-A process, and the output end side may correspond to the right side of the mold cutter 60 in FIG. 1.

The unit structure 100 is the most basic unit constituting an electrode assembly in which a first electrode, a separator, a second electrode, and a separator are sequentially stacked. Specifically, the unit structure 100 is the most basic unit removed from a four-layer sheet by the cutter or the mold cutter 60.

When the four-layer sheet is replaced with a basic unit sheet as described above, a unit structure is the most basic unit constituting an electrode assembly formed by stacking electrode materials and separator materials. Specifically, the unit structure is the most basic unit removed from the basic unit sheet by the cutter or the mold cutter 60.

After the unit structure 100 is formed by cutting the portion of the margin area M using the mold cutter 60 or is formed using the separate cutter as described above, an electrode assembly may be manufactured by stacking a plurality of unit structures 100. Alternatively, an electrode assembly may be manufactured using only one unit structure 100.

When a battery cell installed on electronic devices including typical mobile devices is exemplified, the distance D over which the separator materials 20 and 40 protrude from the edges 12 and 32 of the first and second electrode materials 10 and 30 may range from 0.5 mm to 1.0 mm and be 18 times to 38 times greater than a thickness of the separator materials 20 and 40. The distance D is an experiment result in which the thickness of the separator materials 20 and 40 is 20% to 30% of a thickness of the first and second electrode materials 10 and 30.

The case of cutting the separator materials 20 and 40 included in the four-layer sheet is proposed to obtain the range of the distance D. When the distance D is greater than the range, the size of the battery cell is too great for electric capacity thereof. When the distance D is smaller than the range, a cathode and an anode which face each other with a separator therebetween may be short-circuited. Thus, the range is an optimized value for the distance D.

Until now, the electrode assembly manufacturing method according to the first embodiment has been described by exemplifying the electrode assemblies and the unit structure 100 including the through hole part in the central part thereof. However, the electrode assembly manufacturing method according to the first embodiment may be applied to a process of manufacturing a unit structure and an electrode assembly included in a battery cell having a rectangular shape with a cut edge, a rounded corner, or a chamfered corner, as illustrated in FIGS. 9 to 11.

Embodiment 2

Hereinafter, an electrode assembly manufacturing method will now be described according to the second embodiment of the present invention. Here, different parts between the first and second embodiments will be described principally, and a description of the same parts thereof will be omitted.

Figure 12:
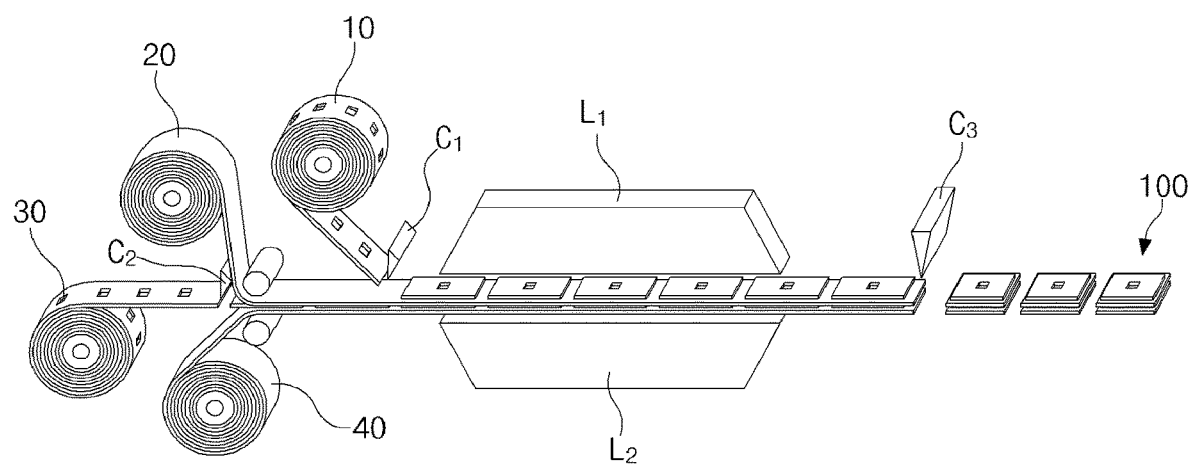
FIG. 12 is a schematic view illustrating an apparatus that embodies an electrode assembly manufacturing method according to a second embodiment of the present invention.

Referring to FIG. 12, the electrode assembly manufacturing method according to the second embodiment includes: a first process in which a first electrode material 10, a separator material 20, a second electrode material 30, and a separator material 40 sequentially undergo a laminating process to form a four-layer sheet; a second-B process in which unit structures 100 formed by cutting the four-layer sheet formed through the first process, at regular intervals are stacked to form an electrode assembly; and a third process in which a portion of a margin area M is cut using a mold cutter 60 such that the separator materials 20 and 40 included in the electrode assembly formed through the second-B process protrude only over a specific distance D from edges 12 and 32 of the first and second electrode materials 10 and 30.

[First Process]

Since the first process according to the second embodiment is the same as the previously-described first process according to the first embodiment, a detailed description thereof will be omitted.

According to the current embodiment, a concept of the four-layer sheet may be expanded to a concept of a basic unit sheet, as in the first embodiment.

[Second-B Process]

The second embodiment is different from the first embodiment in that the unit structures 100 formed by cutting the four-layer sheet or a basic unit sheet at the regular intervals after the first process are stacked to form the electrode assembly, and then, the margin area M is cut using the mold cutter 60. In other words, the portion of the margin area M is cut before the unit structures 100 are stacked to manufacture the electrode assembly according to the first embodiment, whereas the portion of the margin area M is cut after the unit structures 100 are stacked to manufacture the electrode assembly according to the second embodiment.

According to the second embodiment, since the unit structures 100 are formed and stacked to form the electrode assembly after the four-layer sheet or the basic unit sheet is formed through the first process, a cutter C3 is disposed at an output end side of laminators to cut the four-layer sheet or the basic unit sheet.

When basic unit sheets, a concept of which is expanded from a concept of four-layer sheets, are cut to form an electrode assembly, the second-B process may manufacture the electrode assembly by repeatedly stacking unit structures formed by cutting one type of basic unit sheets at the regular intervals, or by stacking, in a predetermined order, e.g., alternately, two or more types of unit structures formed by cutting each of two or more types of basic unit sheets at the regular intervals.

[Third Process]

After the electrode assembly is formed through the second-B process, the third process is performed, which will now be described with reference to FIG. 13.

Figure 13:
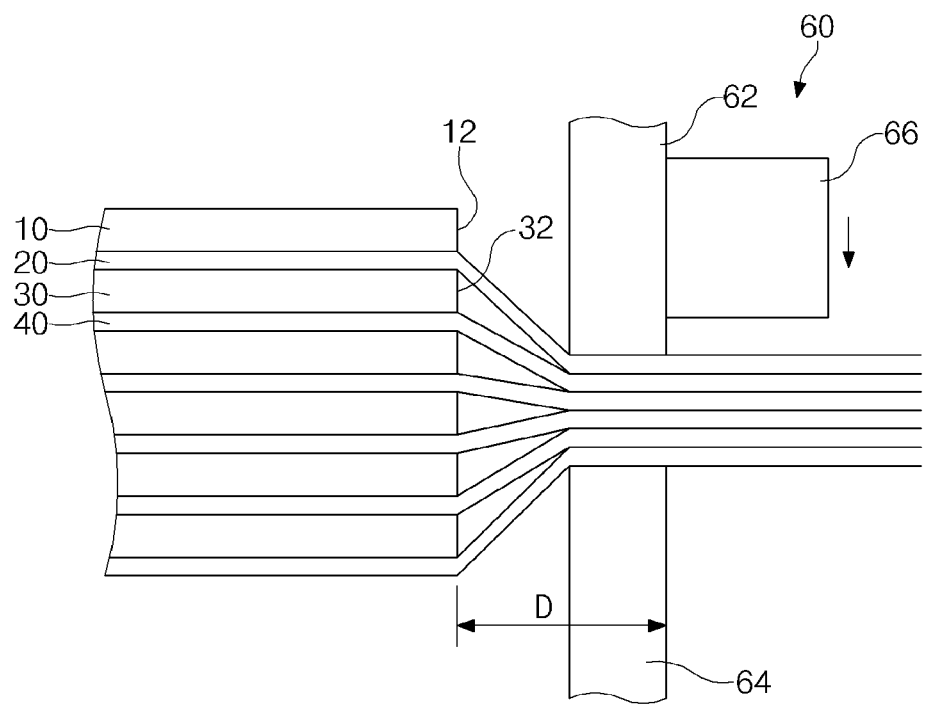
FIG. 13 is a schematic view illustrating a third process of the electrode assembly manufacturing method according to the second embodiment.

The separator materials 20 and 40 of the electrode assembly are disposed between an upper mold 62 and a lower mold 64 of the mold cutter 60, and the upper mold 62 or the lower mold 64 is moved to hold only the separator materials 20 and 40 therebetween, which is illustrated in FIG. 13. Next, when the portion of the margin area M of the separator materials 20 and 40 fixed and held by the upper mold 62 and the lower mold 64 is cut using the cutting block 66, the separators materials 20 and 40 of the electrode assembly protrude over the specific distance D from the edges 12 and 32 of the first and second electrode materials 10 and 30.

Among the separator materials 20 and 40 held by the upper mold 62 and the lower mold 64, the separator materials 20 and 40 disposed in the top and the bottom of the electrode assembly are more stretched than the separator materials 20 and 40 disposed in the middle of the electrode assembly, as illustrated in FIG. 13. Thus, if the distance D, over which the separator materials 20 and 40 protrude from the edges 12 and 32 of the first and second electrode materials 10 and 30, is the same as the distance D of the first embodiment, the separator materials 20 and 40 disposed in the top and the bottom of the electrode assembly may be excessively stretched and broken.

Hence, the distance D of the second embodiment may be greater than the distance D of the first embodiment to prevent the separator materials 20 and 40 from being broken while the portion of the margin area M is cut using the mold cutter 60.

In particular, when an electrode assembly used in a battery cell installed on electronic devices including typical mobile devices is exemplified, the distance D of the second embodiment may range from 1.0 mm to 2.0 mm and be 38 times to 75 times greater than the thickness of the separator materials 20 and 40. However, when the number of the unit structures 100 stacked in the electrode assembly is excessively great, a critical meaning of the range of the distance D of the second embodiment may be negated. Thus, the number of the unit structures 100 stacked in the electrode assembly is limited to 10 or less in the second-B process.

[Effect of Mold Cutting]

An experiment was carried out according to the above-described embodiments, in particular, on appropriacy of laser cutting, ultrasonic cutting, and cutting using a typical cutter to cut the separator materials 20 and 40 such that the separator materials 20 and 40 protrude over only the specific distance D from the edges 12 and 32 of the first and second electrode materials 10 and 30.

According to a result of the experiment, the laser cutting causes the separator materials 20 and 40 issues including a large amount of thermal deformation, burrs, and dust. According to the experiment, the ultrasonic cutting has not only the issues of the laser cutting, but also significantly poor generality so that the ultrasonic cutting cannot be applied to electrode assemblies having various shapes. According to the experiment, the cutting using a typical cutter is free from thermal deformation, burrs, and dust, but has the poorest generality so that the cutting using a typical cutter cannot be applied to electrode assemblies having various shapes.

As a result of the experiment, the cutting using the mold cutter 60 is free from thermal deformation, burrs, and dust, and has the generality so that the cutting using the mold cutter 60 can be applied to electrode assemblies having various shapes. In addition, according to the experiment, the cutting using the mold cutter 60 is substantially the same as the cutting using a typical cutter, in terms of productivity. In addition, according to the experiment, when the upper mold 62 and the lower mold 64 hold the separator materials 20 and 40, appropriate pressure is applied thereto, so as to attach edges of the separator materials 20 and 40 disposed in different layers to one another, thereby significantly reducing short circuiting of a cathode and an anode. Thus, cutting using a mold cutter may be more preferable than the laser cutting, the ultrasonic cutting, and the cutting using a typical cutter.

In addition, the portion of the margin area M of the electrode assembly or the unit structures 100 is cut in the electrode assembly manufacturing methods according to the above-described embodiments of the present invention. Thus, the separator materials are prevented from being cut to be greater or smaller than a desired size, and electrode assemblies having an accurately desired size are manufactured, thereby significantly increasing the yield rate thereof.

[Variations of Unit Structures]

Until now, unit structures having the same size have been described. However, unit structures may have different sizes. When unit structures having different sizes are stacked, electrode assemblies may have various shapes. Here, the size of unit structures is described based on the size of separators. This is because separators are generally greater than electrodes.

Figure 20:
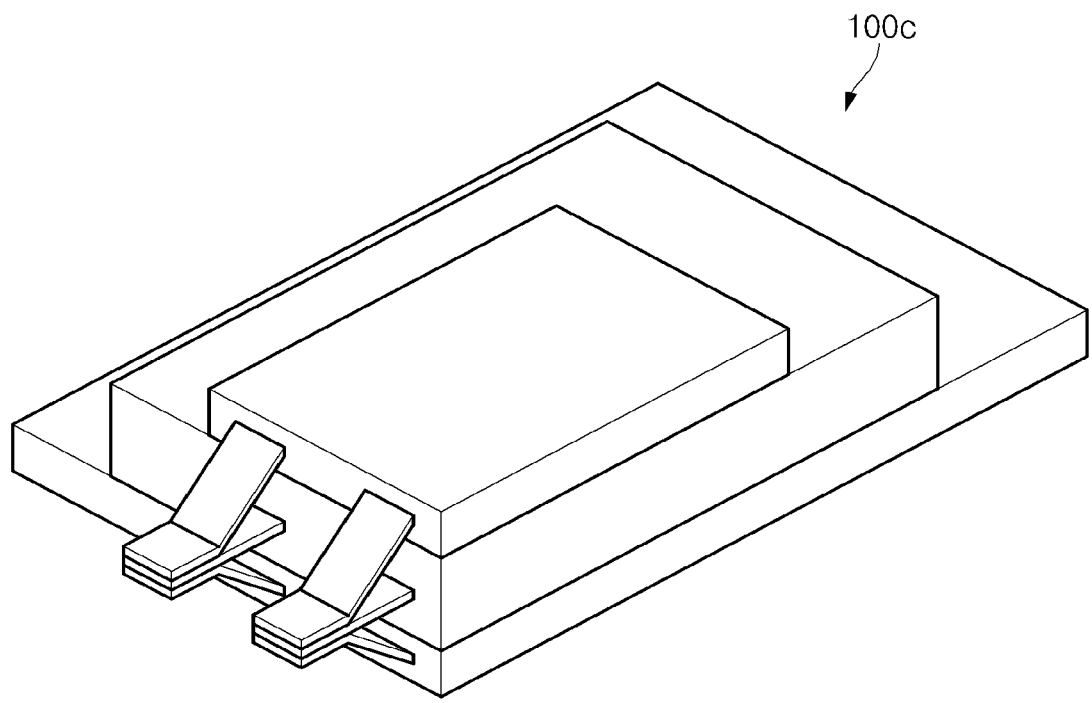
FIG. 20 is a perspective view illustrating an electrode assembly formed by stacking unit structures having different sizes.
Figure 21:
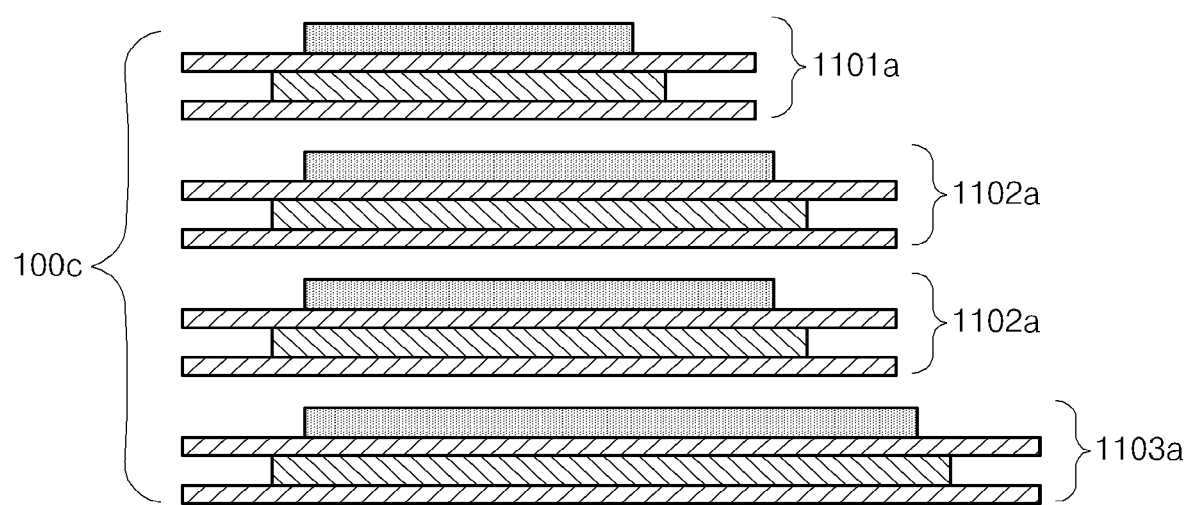
FIG. 21 is a side view illustrating the electrode assembly of FIG. 20.

In particular, referring to FIGS. 20 and 21, a unit structure may include a plurality of sub units 1101a, 1102a, and 1103a. An electrode assembly 100c may be formed by stacking such sub units. The sub units may be classified into at least two groups having different sizes. The sub units may be classified into groups according to the sizes thereof, and the groups may be stacked to form a plurality of steps. Referring to FIGS. 20 and 21, the sub units 1101a, 1102a, and 1103a are classified into three groups according to the sizes thereof, and the three groups are stacked to form three steps. For reference, sub units included in one group may form two or more steps.

As such, when a plurality of steps are formed, unit structures (sub units) may have the above-described four-layer structure or a structure formed by repeatedly stacking the four-layer structure, that is, the structure of the first unit structure (in the present specification, if sub units have the same stacked structure even though the sub units have different sizes, the sub units belong to one type of unit structures).

In particular, the number of cathodes stacked in a step may be the same as the number of anodes stacked therein. Opposite electrodes disposed between steps may face each other with a separator therebetween. However, for example, the second and third unit structures need two types of unit structures to form a step as described above.

However, referring to FIG. 21, first unit structures need only one type of unit structures (sub units) to form a step as described above. Thus, when unit structures (sub units) have the above-described four-layer structure or a structure formed by repeatedly stacking the four-layer structure, the number of types of the unit structures (the substrate units) for forming a plurality of steps is decreased.

In addition, for example, the second and third unit structures need two types of at least two stacked unit structures to form a step as described above, and thus, the step has a structure of at least twelve layers. However, the first unit structures need only one type of unit structures (sub units) to form a step as described above, and thus, the step has a structure of at least four layers. Thus, when unit structures (sub units) have the above-described four-layer structure or a structure formed by repeatedly stacking the four-layer structure, the thickness of each of steps to be formed can be significantly easily adjusted.

Figure 22:
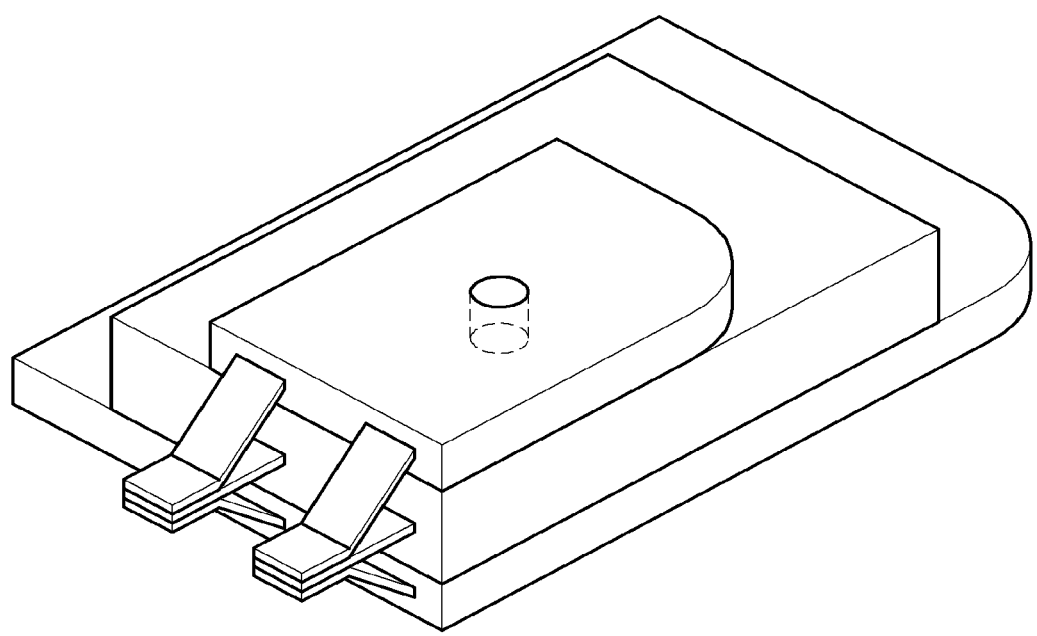
FIG. 22 is a perspective view illustrating an electrode assembly formed by stacking unit structures having different geometrical shapes.

Unit structures (sub units) may have not only different sizes, but also different geometrical shapes. For example, referring to FIG. 22, sub units may be different in corner shape and presence of a hole as well as in size. More particularly, as illustrated in FIG. 22, the sub units may be classified into three groups according to geometrical shapes thereof, and the three groups may be stacked to form three steps. To this end, unit structures may include sub units classified into at least two groups (the groups are different from each other in geometrical shape). Also in this case, the unit structures (the sub units) may have the above-described four-layer structure or a structure formed by repeatedly stacking the four-layer structure, that is, the structure of the first unit structure (in the present specification, if sub units have the same stacked structure even though the sub units have different geometrical shapes, the sub units belong to one type of unit structures).

[Stacking of Auxiliary Units]

An electrode assembly may further include at least one of a first auxiliary unit and a second auxiliary unit.

First, the first auxiliary unit will now be described. An electrode is disposed at the distal end of a side of unit structures, and a separator is disposed at the distal end of another side of the unit structures. Thus, when the unit structures are sequentially stacked, the electrode (refer to an electrode 116 illustrated in FIG. 23, which is referred to as "a distal end electrode" hereinafter) is disposed on the uppermost or lowermost side of the electrode assembly. The first auxiliary unit is additionally disposed as a layer on the distal end electrode (for reference, an electrode assembly may have a configuration including an auxiliary unit).

Figure 23:
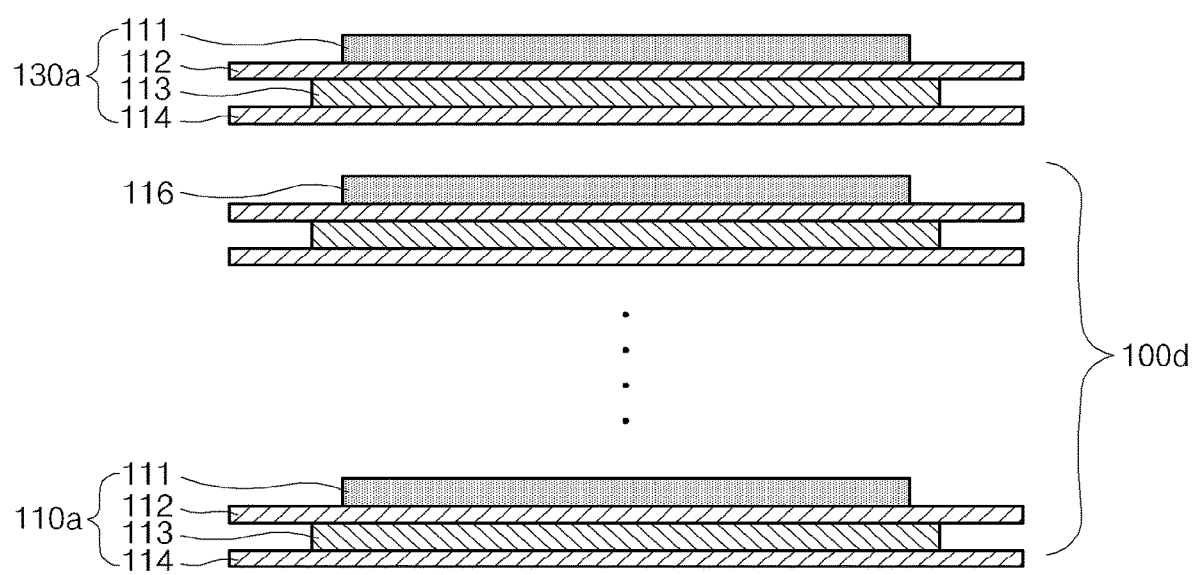
FIG. 23 is a side view illustrating a first structure of an electrode assembly including unit structures and a first auxiliary unit.

In more particular, referring to FIG. 23, when the distal end electrode 116 is a cathode, a first auxiliary unit 130*a* may be formed by sequentially stacking a separator 114, an anode 113, a separator 112, and a cathode 111 from the distal end electrode 116, that is, outwardly from the distal end electrode 116. In addition, referring to FIG. 24, when a distal end electrode 116 is an anode, a first auxiliary unit 130*b* may be formed by sequentially stacking a separator 114 and a cathode 113 from the distal end electrode 116, that is, outwardly from the distal end electrode 116.

Figure 24:
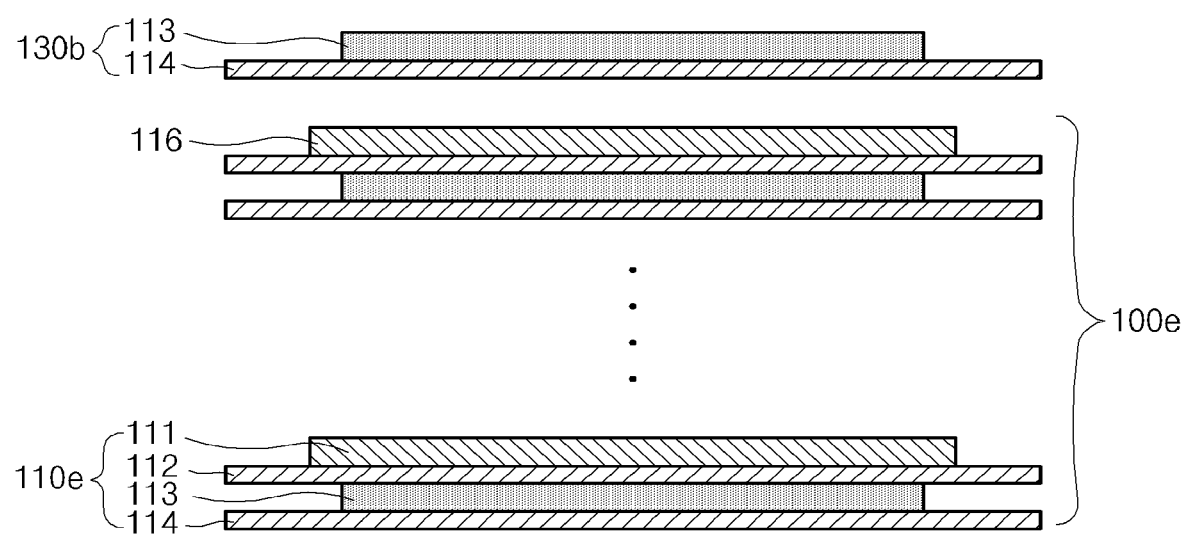
FIG. 24 is a side view illustrating a second structure of an electrode assembly including unit structures and a first auxiliary unit.

Referring to FIGS. 23 and 24, the cathodes may be disposed on the outermost distal end electrode side of electrode assemblies 100*d* and 100*e* by using the first auxiliary units 130*a* and 130*b*. In this case, the outermost cathode, that is, the cathode of the first auxiliary unit includes a collector, and only one surface of the collector facing the unit structures (only a surface facing the lower side of FIG. 23) may be coated with an active material layer. Then, there is no active material layer on the outermost distal end electrode side, thus saving an active material layer. For reference, since a cathode is a configuration for discharging, for example, lithium ions, when the cathode is disposed on the outermost side of an electrode assembly, battery capacity is improved.

Next, the second auxiliary unit will now be described. The second auxiliary unit basically performs the same function as that of the first auxiliary unit. In particular, an electrode is disposed at the distal end of a side of unit structures, and a separator is disposed at the distal end of another side of the unit structures. Thus, when the unit structures are sequentially stacked, the separator (refer to a separator 117 illustrated in FIG. 25, which is referred to as "a distal end separator" hereinafter) is disposed on the uppermost or lowermost side of the electrode assembly. The second auxiliary unit is additionally disposed as a layer on the distal end separator.

Figure 25:
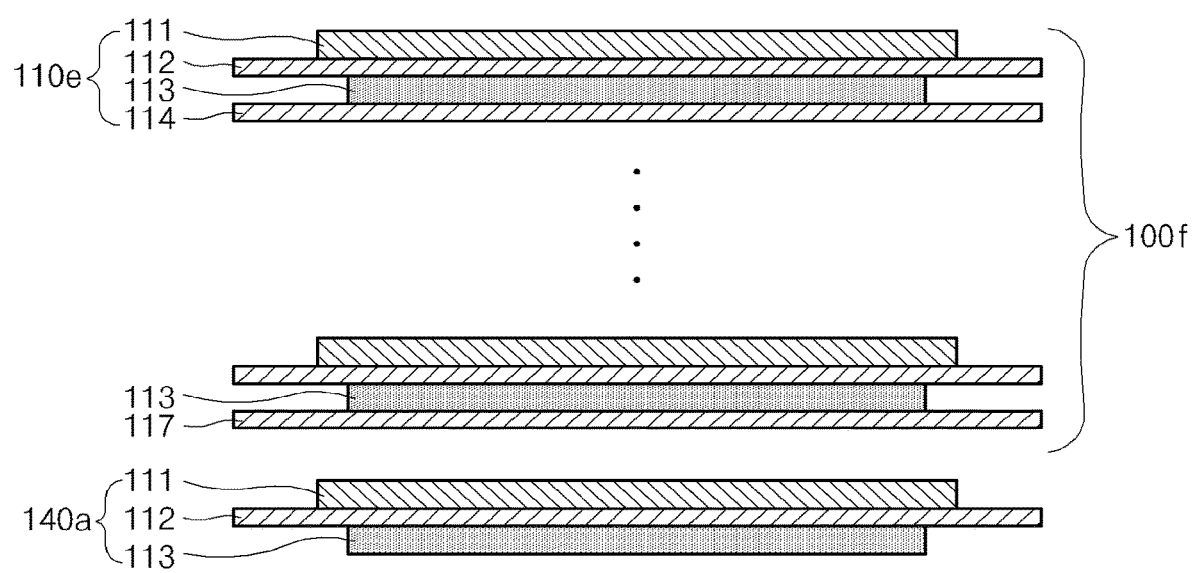
FIG. 25 is a side view illustrating a third structure of an electrode assembly including unit structures and a second auxiliary unit.

In more particular, referring to FIG. 25, when an electrode 113 contacting the distal end separator 117 of a unit structure is a cathode, a second auxiliary unit 140*a* may be formed by sequentially stacking an anode 111, a separator 112, and a cathode 113 from the distal end separator 117. In addition, referring to FIG. 26, when an electrode 113 contacting a distal end separator 117 of a unit structure is an anode, a second auxiliary unit 140*b* may be formed as a cathode 111.

Figure 26:
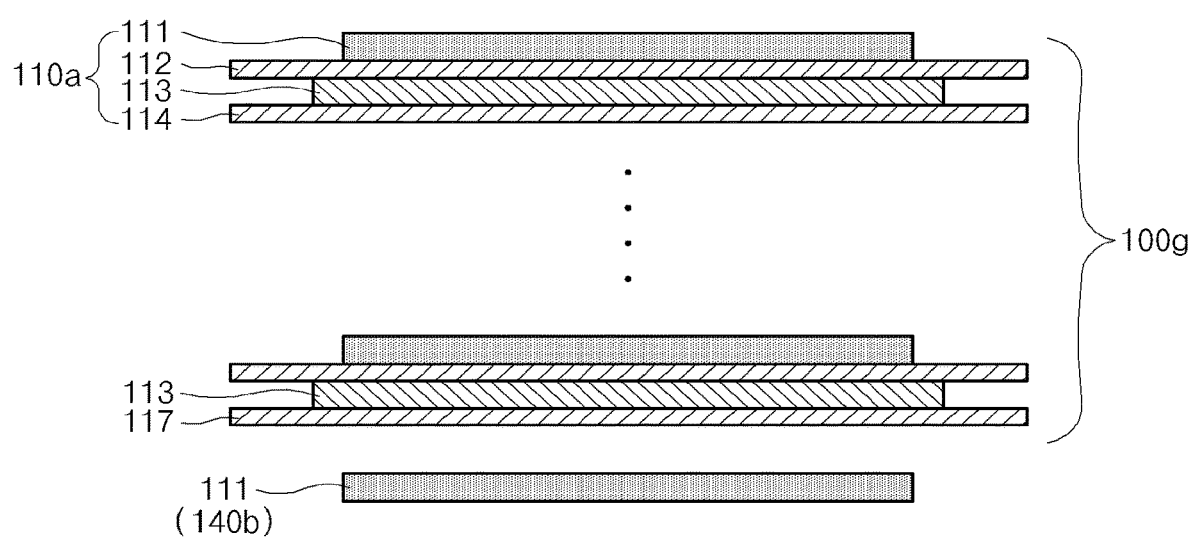
FIG. 26 is a side view illustrating a fourth structure of an electrode assembly including unit structures and a second auxiliary unit.

Referring to FIGS. 25 and 26, the cathodes may be disposed on the outermost distal end separator side of electrode assemblies 100*f* and 100*g* by using the second auxiliary units 140*a* and 140*b*. In this case, the outermost cathode, that is, the cathode of the second auxiliary unit includes a collector, as in the cathode of the first auxiliary unit, and only one surface of the collector facing the unit structures (only a surface facing the upper side of FIG. 25) may be coated with an active material layer.

Figure 27:
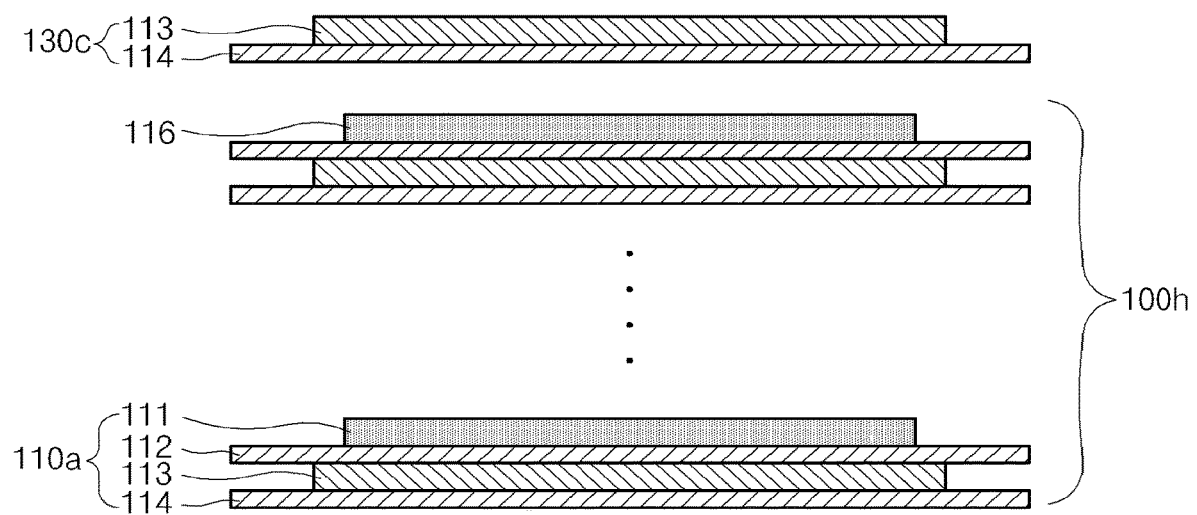
FIG. 27 is a side view illustrating a fifth structure of an electrode assembly including unit structures and a first auxiliary unit.

However, first and second auxiliary units may have structures different from the above described structures. First, a first auxiliary unit will now be described. Referring to FIG. 27, when a distal end electrode 116 is a cathode, a first auxiliary unit 130*c* may be formed by sequentially stacking a separator 114 and an anode 113 from the distal end electrode 116. In addition, referring to FIG. 28, when a distal end electrode 116 is an anode, a first auxiliary unit 130*d* may be formed by sequentially stacking a separator 114, a cathode 113, a separator 112, and an anode 111 from the distal end electrode 116.

Figure 28:
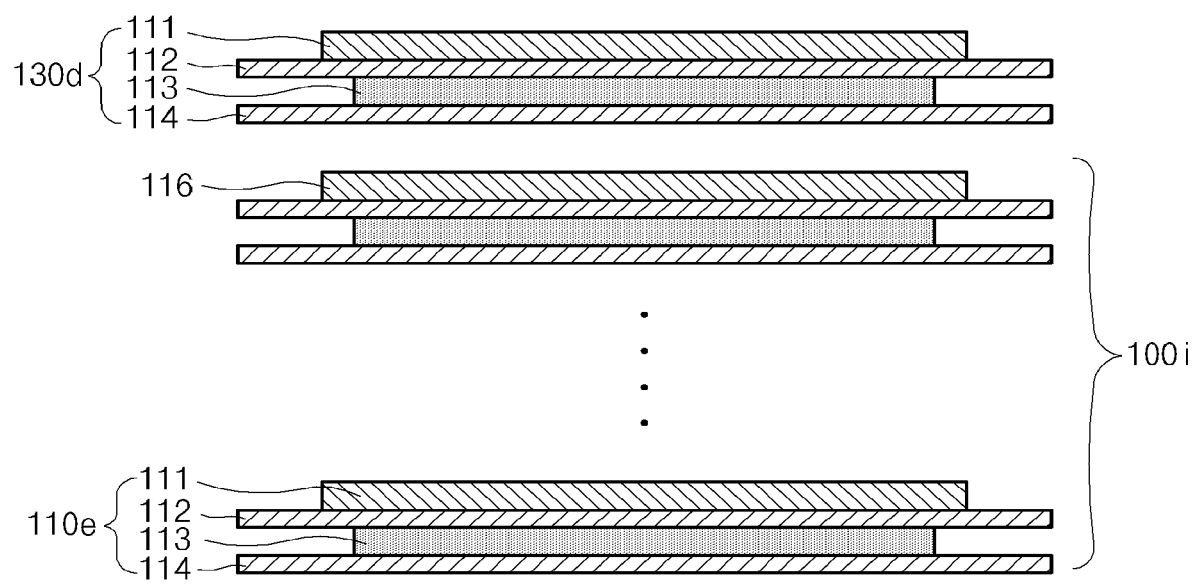
FIG. 28 is a side view illustrating a sixth structure of an electrode assembly including unit structures and a first auxiliary unit.

Referring to FIGS. 27 and 28, the anodes may be disposed on the outermost distal end electrode side of electrode assemblies 100*h* and 100*i* by using the first auxiliary units 130*c* and 130*d*.

Figure 29:
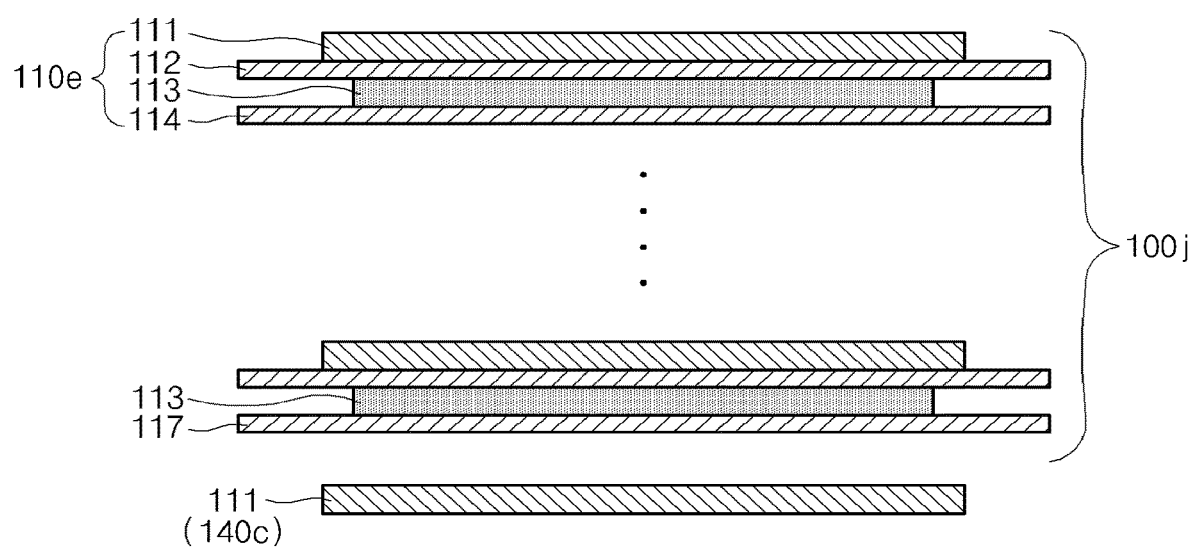
FIG. 29 is a side view illustrating a seventh structure of an electrode assembly including unit structures and a second auxiliary unit.
Figure 30:
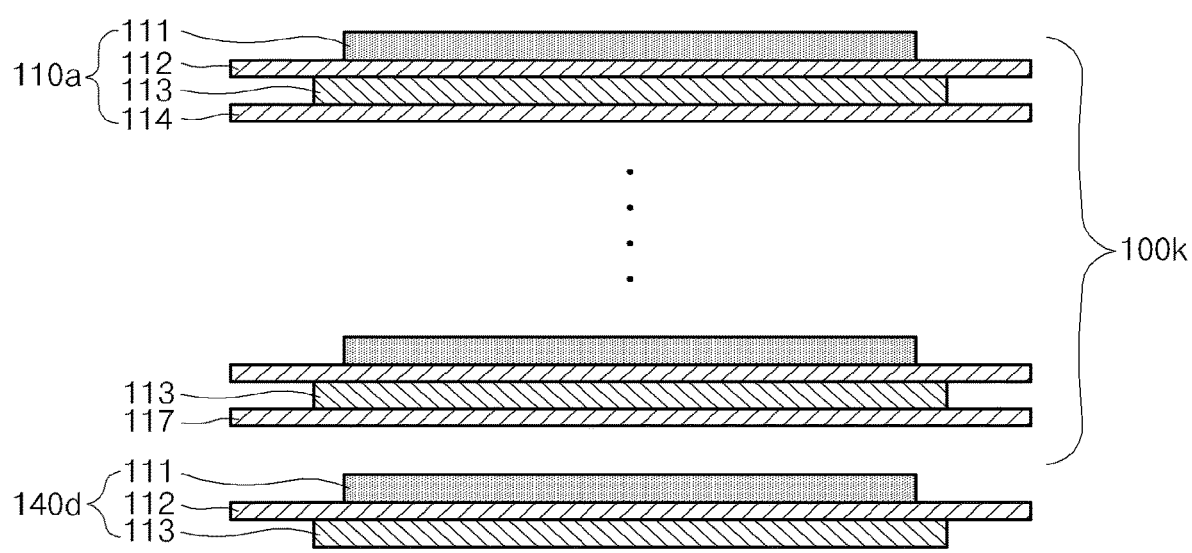
FIG. 30 is a side view illustrating an eighth structure of an electrode assembly including unit structures and a second auxiliary unit.

Next, a second auxiliary unit will now be described. Referring to FIG. 29, when an electrode 113 contacting a distal end separator 117 of a unit structure is a cathode, a second auxiliary unit 140*c* may be formed as an anode 111. In addition, referring to FIG. 30, when an electrode 113 contacting a distal end separator 117 of a unit structure is an anode, a second auxiliary unit 140*d* may be formed by sequentially stacking a cathode 111, a separator 112, and an anode 113 from the distal end separator 117. Referring to FIGS. 29 and 30, the anodes may be disposed on the outermost distal end separator side of electrode assemblies 100*j* and 100*k* by using the second auxiliary units 140*c* and 140*d*.

Figure 31:
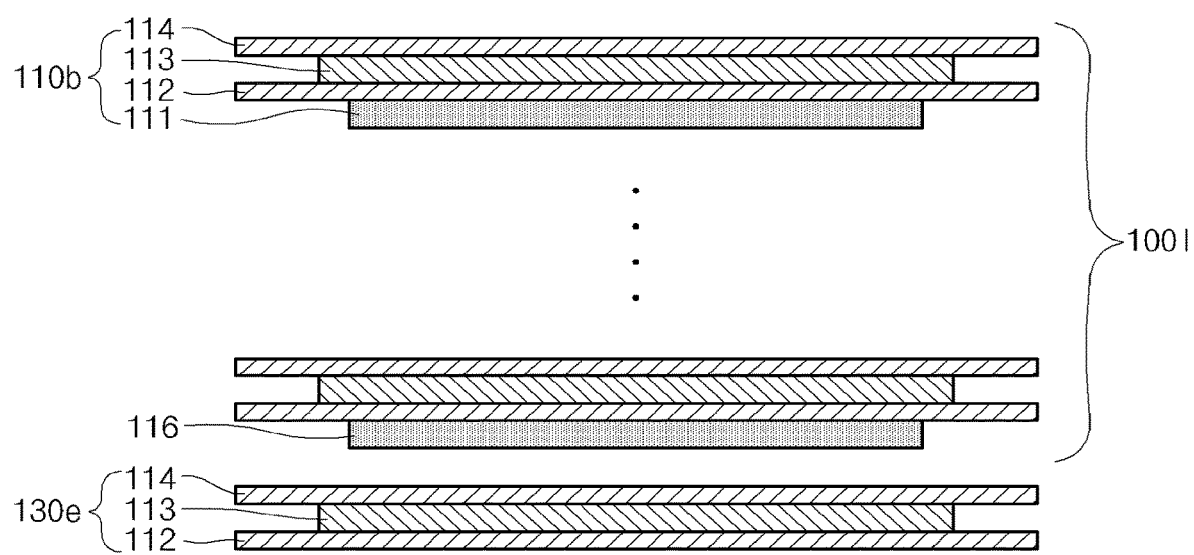
FIG. 31 is a side view illustrating a ninth structure of an electrode assembly including unit structures and a first auxiliary unit.

For reference, an anode may react with an aluminum layer of a battery case (for example, a pouch type case) due to a potential difference therebetween. Thus, the anode may be insulated from the battery case by a separator. To this end, first and second auxiliary units as illustrated in FIGS. 27 to 30 may further include a separator on an outer side of an anode. For example, unlike the first auxiliary unit 130*c* illustrated in FIG. 27, a first auxiliary unit 130*e* illustrated in FIG. 31 may further include a separator 112 on an outermost side thereof. For reference, when an auxiliary unit includes a separator, the auxiliary unit is more easily aligned with a unit structure.

Figure 32:
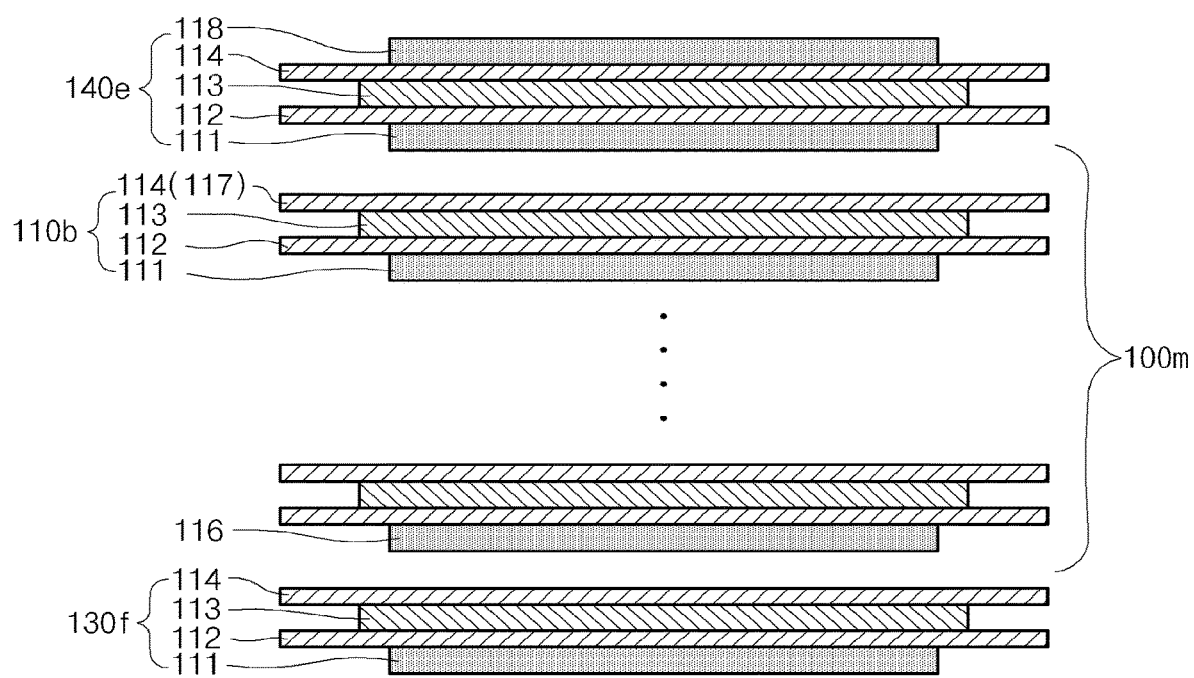
FIG. 32 is a side view illustrating a tenth structure of an electrode assembly including unit structures, a first auxiliary unit, and a second auxiliary unit.

Referring to FIG. 32, an electrode assembly 100*m* may be formed. A unit structure 110*b* may be formed by sequentially stacking a first electrode 111, a first separator 112, a second electrode 113, and a second separator 114 from the lower side of the unit structure 110*b* to the upper side thereof. The first electrode 111 may be a cathode, and the second electrode 113 may be an anode.

A first auxiliary unit 130*f* may be formed by sequentially stacking a separator 114, an anode 113, a separator 112, and a cathode 111 from a distal end electrode 116. The cathode 111 of the first auxiliary unit 130*f* includes a collector, and an active material layer may be formed on only a surface of the collector facing the unit structure 110*b*.

A second auxiliary unit 140*e* may be formed by sequentially stacking a cathode 111 (a first cathode), a separator 112, an anode 113, a separator 114, and a cathode 118 (a second cathode) from a distal end separator 117. The cathode 118 (the second cathode) of the second auxiliary unit 140*e*, which is disposed an outermost side thereof, includes a collector, and an active material layer may be formed on only a surface of the collector facing the unit structure 110*b*.

Figure 33:
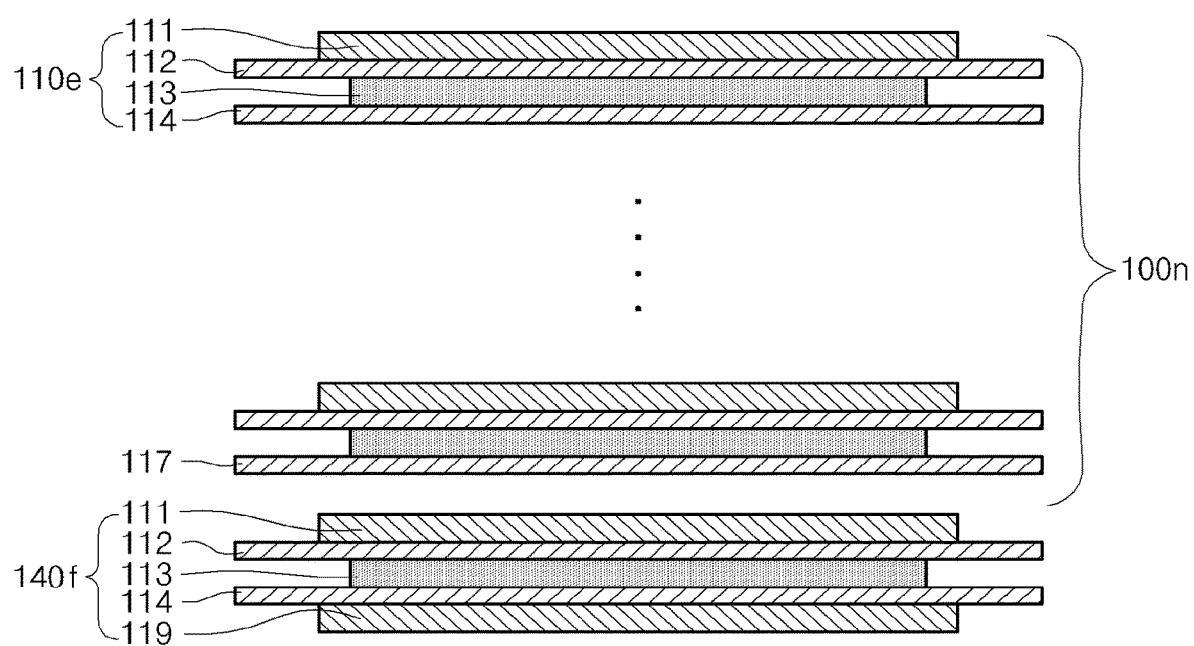
FIG. 33 is a side view illustrating an eleventh structure of an electrode assembly including unit structures and a second auxiliary unit.

Finally, referring to FIG. 33, an electrode assembly 100*n* may be formed. A unit structure 110*e* may be formed by sequentially stacking a first electrode 111, a first separator 112, a second electrode 113, and a second separator 114 from the upper side of the unit structure 110*e* to the lower side thereof. The first electrode 111 may be an anode, and the second electrode 113 may be a cathode. A second auxiliary unit 140*f* may be formed by sequentially stacking an anode 111, a separator 112, a cathode 113, a separator 114, and an anode 119 from a distal end electrode 117.

While the present invention has been described with reference to the foregoing specific preferred embodiments, it will be understood by those of ordinary skill in the art that various changes could be made therein without departing from the spirit and scope of the present invention as defined by the following claims.

What is claimed is:

1. An electrode assembly manufacturing method comprising:
   a first process of manufacturing one type of basic unit sheets having a structure in which electrode materials and separator materials, which are the same in number, are alternately stacked, or two or more types of basic unit sheets having a structure in which electrode materials and separator materials, which are the same in number, are alternately stacked;
   a second-B process of forming an electrode assembly by repeatedly stacking unit structures formed by cutting the one type of the basic unit sheets at regular intervals, or by stacking, in a predetermined order, two or more types of unit structures formed by cutting each of the two or more types of the basic unit sheets at the regular intervals; and
   after stacking the unit structures formed by the second-B process, a third process of cutting a portion of a margin area of the separator materials, which are not covered with the electrode materials, such that the separator materials included in the electrode assembly protrude over a specific distance from edges of the electrode materials,
   wherein the one type of the basic unit sheets have a four-layer structure formed by sequentially stacking a first electrode material, a first separator material, a second electrode material, and a second separator material, or a structure formed by repeatedly stacking the four-layer structure,
   the two or more types of the basic unit sheets are stacked one by one in a predetermined order to form the four-layer structure or a structure formed by repeatedly stacking the four-layer structure, and
   in the third process, only the separator materials are held between an upper mold and a lower mold of a mold cutter thereby applying pressure to the separator materials so as to fix adhere the separator materials to each other and to cut the portion of the margin area of the separator materials fixed and held by the upper mold and the lower mold by using a cutting block of the mold cutter that is moveable relative to the upper mold and the lower mold.

2. The electrode assembly manufacturing method of claim 1, wherein the electrode assembly includes 10 or fewer unit structures in the second-B process.

3. The electrode assembly manufacturing method of claim 1, wherein the distance ranges from 1.0 mm to 2.0 mm.

4. The electrode assembly manufacturing method of claim 1, wherein the distance is 38 times to 75 times greater than a thickness of the separator materials.

5. The electrode assembly manufacturing method of claim 1, wherein adhesive force between an electrode and a separator adjacent to the electrode in the unit structures is greater than adhesive force between the unit structures in the electrode assembly.

6. The electrode assembly manufacturing method of claim 1, wherein both surfaces of the separator materials included in the basic unit sheets and disposed between two of the electrode materials are coated with a coating material having adhesive force, and only a surface of the other separator materials contacting the electrode materials is coated with the coating material having adhesive force.

7. The electrode assembly manufacturing method of claim 1, wherein an electrode of the unit structures is adhered to a separator adjacent to the electrode.

* * * * *